United States Patent [19]

Chou

[11] Patent Number: 5,856,427
[45] Date of Patent: Jan. 5, 1999

[54] PROCESS FOR THE PRODUCTION OF POLYSUCCINIMIDE

[75] Inventor: Yueting Chou, Chesterfield, Mo.

[73] Assignee: Solutia Inc., St. Louis, Mo.

[21] Appl. No.: 585,673

[22] Filed: Jan. 16, 1996

[51] Int. Cl.$^6$ .................................................. C08G 69/10
[52] U.S. Cl. .......................... 528/328; 528/361; 528/364; 528/480; 528/495; 528/503; 525/420; 548/520
[58] Field of Search ..................... 528/328, 361, 528/364, 480, 495, 503; 525/420; 548/520

[56] References Cited

U.S. PATENT DOCUMENTS

| | | |
|---|---|---|
| 3,846,380 | 11/1974 | Fujimoto et al. . |
| 4,333,844 | 6/1982 | Duggleby et al. . |
| 4,363,797 | 12/1982 | Jacquet et al. . |
| 4,407,722 | 10/1983 | Davies et al. . |
| 4,428,749 | 1/1984 | Morris . |
| 5,057,597 | 10/1991 | Koskan . |
| 5,266,237 | 11/1993 | Freeman et al. . |
| 5,292,864 | 3/1994 | Wood et al. . |
| 5,315,010 | 5/1994 | Koskan et al. . |
| 5,319,145 | 6/1994 | Paik et al. . |
| 5,371,179 | 12/1994 | Paik et al. . |
| 5,380,817 | 1/1995 | Paik et al. . |
| 5,401,428 | 3/1995 | Kalota et al. ........................ 252/49.3 |
| 5,457,176 | 10/1995 | Adler et al. . |
| 5,552,517 | 9/1996 | Martin ..................................... 528/363 |

FOREIGN PATENT DOCUMENTS

| | | |
|---|---|---|
| 14775/92 | 4/1992 | Australia . |
| 0493757A2 | 12/1991 | European Pat. Off. . |
| 0640641A1 | 8/1994 | European Pat. Off. . |

OTHER PUBLICATIONS

"Water Soluble Polyamides as Potential Drug Carriers", pp. 35–50, Eberhard W. Neuse et al *Die Angewandte Makromolekulare Chemie* 192 (1991).

"Temperature Effect on the Molecular Weight and the Optical Purity of Anhydropolyaspartic Acid Prepared by Thermal Polycondensation", *Bulletin of the Chemical Society of Japan*, vol. 51(5), 1555–1556 (1978), Kokufuta et al.

*J.O.C.S.*, vol. 26, 1084–1091 (1961), J. Kovacs et al.

National Council on Research and Development NRCD 8–76, Seawater Desalination 150–157 (1977), Sarig et al.

*Primary Examiner*—Duc Truong
*Attorney, Agent, or Firm*—Fitzpatrick, Cella, Harper & Scinto

[57] ABSTRACT

There is disclosed a process for preparing polysuccinimide by the thermal polycondensation of amino acids such as L-aspartic acid in the presence of an acidic catalyst for the polycondensation reaction and a surfactant either in the dry state or in the presence of a high boiling organic reaction medium whereby a polymer is provided more efficiently.

26 Claims, 1 Drawing Sheet

→ CURVE B: EXAMPLE 2, NONIONIC   ■ CURVE A: EXAMPLE 1, NO SURFACTANT   ♦ CURVE C: EXAMPLE 3, ANIONIC

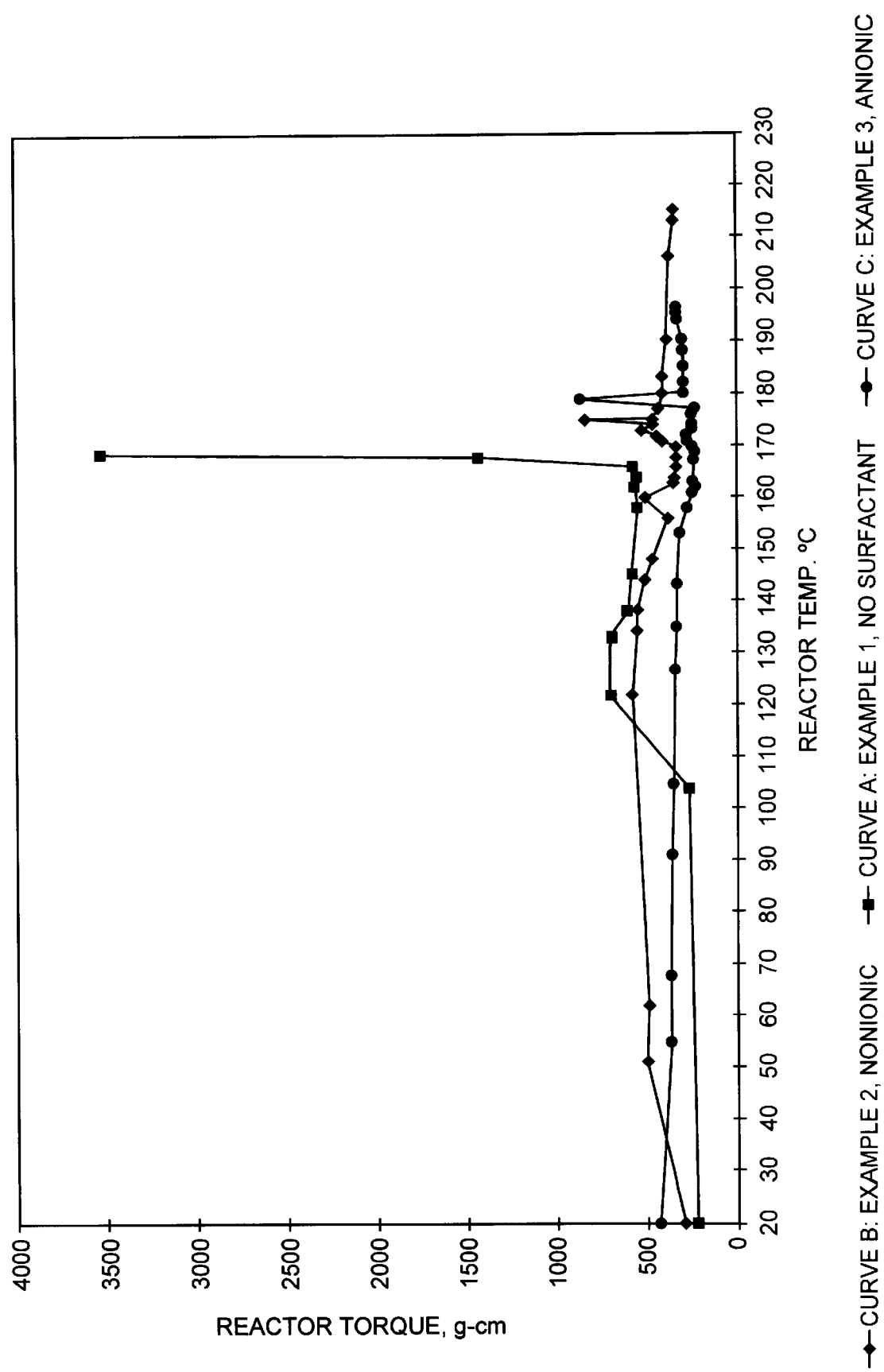

PROCESS FOR THE PRODUCTION OF POLYSUCCINIMIDE

This invention relates to the production of polysuccinimide by catalyzed thermal polymerization of L-aspartic acid in either the dry state or in the presence of and organic medium. More particularly, this invention relates to an improved process for the thermal polymerization of L-aspartic acid wherein the rate of reaction is increased or the efficiency in an organic medium is improved.

BACKGROUND OF THE INVENTION

Polyaspartic acid has been produced by thermal polymerization of L-aspartic acid which involves heating the acid to a temperature in the range of from about 200° C. to about 400° C. Water is driven off as the acid polymerizes to form polysuccinimide. The imide is easily converted to polyaspartic acid by basic hydrolysis. Early interest in such processes related to theories for formation of prebiotic polypeptides. For the purpose of testing such theories laboratory experiments used powdered L-aspartic acid, usually packed in the bottom of a flask which was then heated below the melting point of the acid. Such reactions were slow and took place over many hours. One such example is reported by Kokufuta et al. in Bulletin of the Chemical Society of Japan Vol. 51 (5) 1555–1556 (1978) "Temperature Effect on the Molecular Weight and the Optical Purity of Anhydropolyaspartic Acid Prepared by Thermal Polycondensation." The structure of anhydropolyaspartic acid has been thoroughly investigated such as by J. Kovacs et al. in J.O.C.S. Vol. 26 1084–1091 (1961).

In recent years many utilities have been suggested for anhydropolyamino acid. Such polyamides have been suggested as potential drug carriers by Neuse et al. in Die Angewandte Makronmolekulare Chemie 192 35–50 (1991) "Water-soluble polyamides as potential drug carriers." They have also been tested as scale inhibitors with respect to natural sea water and calcium sulfate in particular by Sarig et al. as reported by the National Council on Research and Development (NRCD 8–76, Seawater Desalination 150–157 (1977). Polyaspartic acid has been well known for its ability to disperse solid particles in detergent formulations, having been mentioned as a dispersant in numerous patents, a few of which are U.S. Pat. Nos. 4,363,797; 4,333,844; 4,407,722 and 4,428,749. Also, as described in U.S. Pat. No. 4,971,724 to Kalota et al., it has been discovered that compositions comprising polyamino acids such as aspartic acid, when ionized at alkaline pH, effectively inhibit corrosion of ferrous metals in the presence of aqueous medium. Various derivatives of polyamino acids have also been made wherein attributes have been supplied by groups attached to reactive sites on the molecule. One such example is disclosed in U.S. Pat. No. 3,846,380 to Fujimoto et al.

Because of the various impending potential utilities of anhydropolyamino acids, interest in processes for preparing such compounds in large volume, particularly polyaspartic acid, has increased. This interest has resulted in several recent patents being issued which are directed to fluid bed systems; in particular, U.S. Pat. No. 5,219,986 to Cassata. Other such patents are U.S. Pat. Nos. 5,057,597 and 5,221,733 to Koskan and Koskan et al. respectively. More recently, patents have issued covering a process for preparing the polysuccinimide by means of tray driers such as a directly heated rotary tray drier in U.S. Pat. No. 5,319,145 to Paik et al. and an indirectly heated tray drier in U.S. Pat. No. 5,315,010 to Koskan et al. When phosphoric acid is employed in these processes the aspartic acid undergoes polymerization to form the polysuccinimide, forming a course powder containing lumps of up to about two and one-half centimeters in diameter. Prior to subsequent processing the course powder must be treated to remove the lumps. Furthermore, in the use of an acidic catalyst such as phosphoric the powder undergoes a tacky phase which makes the powder difficult to handle in these dryers.

It has been often noted in the literature that the color of the polysuccinimide is related in rough manner to the time/temperature relationship in its production. For example, the color of the product from processes employing relatively longer reaction time under elevated temperature produces more darkly colored polysuccinimide than is produced with shorter reaction time and lower temperatures. A typical teaching of this phenomenon is found in a publication entitled "Temperature Effect on the Molecular Weight and the Optical Purity of Anhydropolyaspartic acid Prepared by Thermal Polycondensation" by Kokufuta et al., Bulletin of the Chemical Society of Japan, Vol. 51, pp. 1555–1556, 1978.

Many efforts have been made to lower the time/temperature relationship by employing the above noted dryers. However, the polysuccinimide produced by such processes possesses an undesirable color. The color of the polysuccinimide is transferred to the water soluble salt upon hydrolysis of the initial product.

It has been reported in the literature that the use of acidic catalysts such as phosphoric acid reduces the color of the resulting polysuccinimide. It is believed that phosphoric acid increases the reaction rate and therefore reduces the amount of time required at high temperature for completion of the reaction. While color of the polysuccinimide produced in a solution of phosphoric acid is improved, the use of large amounts of acid is inconvenient. Another attempt to employ liquid media for the L-aspartic polymerization process is found in U.S. Pat. No. 5,371,179 wherein the use of poly (alkylene glycols) is employed. A wide range of acidic catalysts employed in the process for thermal polymerization of L-aspartic acid is found in U.S. Pat. No. 5,457,176 to Adler et al.

Acid catalysts cause problems in achieving homogeneous reaction mixtures due to the formation of lumps of solids in the reaction mixture containing L-aspartic as polysuccimide forms and water is expelled. This problem increases as the amount of acid catalyst increases. One solution to this problem appears in the above noted U.S. patent to Adler et al. There is described therein the use of phosphoric acid as well as other acid catalysts in a process wherein processing aids are employed for the purpose of maintaining the reaction mixture in a homogeneous condition. Such processing aid are described as mechanical means to break up the lumps or the addition of such materials as zeolites, sulfates, sulfonates, carbonates, perchlorate, silicates, chlorides, bromides, alumina, glass beads, polymeric granules, polysuccinimide polymer or mixtures thereof.

While phosphoric acid aids in producing polysuccinimide of lighter color, there is always process variation which result in polysuccinimide having an undesirable amount of color. In one attempt to overcome the color problem it has been found that the polyaspartate formed by thermal polymerization of L-aspartic acid, followed by alkaline hydrolysis is treated with bleach in water solution. This treatment is reported to decolorize the solution of polyaspartate as noted in U.S. Pat. No. 5,292,864 to Wood, et al. However, in many instances the color of the polysuccinimide becomes a disadvantage as this initial product is employed without first converting it to the water soluble polyaspartate salt as was done in the above noted patent to Wood et al. For example, in U.S. Pat. No. 5,266,237 to Freeman et al. and Australian Patent AU-A-14775/92, the polysuccinimide is added directly to other ingredients to form a detergent composition. The color of the polysuccinimide, particularly in detergent applications, is desirably white. Thus the method of decolorizing the water solution of the salt is not useful in preparing desirable compositions of the above noted patent to Freeman et al. which incorporate the succinimide.

Recent investigations of the process for polymerizing L-aspartic acid has led to various the discovery of various liquid media in which the reaction takes place. In EP 640641 assigned to Mitsui Toatsu there is disclosed a process wherein a portion of the liquid medium is removed during the reaction while charging additional organic solvent containing less water. Water is removed from the withdrawn medium and then returned to the reactor. Although this process described by example at relatively low concentrations, there is noted a formation of non-uniform (heterogeneous) mixture and bulk material was stirred during the reaction.

In copending application Ser. No. 08/398,323 filed Mar. 3, 1995, now U.S. Pat. No. 5,552,517, there is disclosed the use of organic liquids which surprisingly provide excellent results in the thermal polycondensation process whereby L-aspartic acid is converted to polysuccinimide. In these liquid systems there is a need for reducing the drag on mixing equipment which results in high energy usage and non-uniform admixture of the L-aspartic acid with the acid catalyst typically employed.

Accordingly, there is needed a convenient process for the production of polysuccinimide which has acceptable color for detergent applications without the need for decolorization. More convenient liquid media are needed for large scale production of polysuccinimide having very little color.

BRIEF DESCRIPTION OF THE INVENTION

Improved processes for the thermal polycondensation of L-aspartic acid have been discovered wherein L-aspartic acid is polymerized in the presence of a surfactant whereby an improved rate of reaction occurs in the dry state and with a liquid reaction medium the efficiency of mixing is improved. The addition of a surfactant to either the dry mix of L-aspartic acid or to the liquid medium results in beneficial results and is easily adapted to most any known processes for converting L-aspartic acid to polysuccinimide by thermal polycondensation.

BRIEF DESCRIPTION OF THE DRAWING

The attached drawing is a graphical representation of the power supplied to a stirred reactor in which the process of this invention is carried out in a liquid medium. The amount of torque provided the mixing blade is shown over time as the reaction progresses indicating that without the use of surfactant in accordance with this invention the amount of torque required is comparatively very high.

DETAILED DESCRIPTION OF THE INVENTION

In a preferred embodiment, the process of this invention employs a liquid medium. Any suitable liquid medium may be employed including, preferably, those described in the above noted copending application. In said copending application there is described high boiling alkyl alcohols and alkanes particularly useful as liquid media in the process to polymerize L-aspartic acid by thermal polycondensation. The term "high boiling" as used therein refers to a liquid having a boiling point at atmospheric pressure above the reaction temperature for the thermal polycondensation of L-aspartic acid. In operation, the L-aspartic acid is slurried in the organic medium together with a surfactant in accordance with this invention. An inorganic acid catalyst such as phosphoric acid can be added after the slurry is formed, or dispersed evenly throughout the monomer prior to being added to the organic liquid. The slurry is heated within the range of from about 140° C. to about 260° C. with agitation sufficient to prevent the solids from congealing. As the reaction proceeds, water, which is insoluble in the organic medium of this invention, is removed from the mixture by distillation. Reaction times range from about 1 to about 5 hours. The reaction product is a solid which is easily removed from the reaction medium by conventional means such as filtration, etc. The liquid medium can be recycled for preparation of additional amounts of polysuccinimide. Of course, other liquid media known in the art such as diphenyl ether, polyethylene glycol, etc. can also be employed in the process of this invention.

In the embodiment of this invention wherein L-aspartic acid is condensed without the use of a liquid medium, a surfactant in accordance with this invention is thoroughly mixed with the acid and the mixture subjected to thermal polycondensation.

The preferred surfactants which can be employed in the process of this invention are synthetic anionic and nonionic compounds. The former are usually water-soluble alkali metal salts of organic sulphates and sulphonates having alkyl radicals containing from about 8 to about 22 carbon atoms, the term alkyl being used to include the alkyl portion of higher acyl radicals. Examples of suitable synthetic anionic surfactants are sodium and potassium alkyl sulphates, especially those obtained by sulphating higher ($C_8$–$C_{18}$) alcohols produced for example from tallow or coconut oil; sodium and potassium alkyl ($C_9$–$C_{20}$) benzene sulphonates, particularly sodium linear secondary alkyl ($C_{10}$–$C_5$) benzene sulphonates; sodium alkyl glyceryl ether sulphates, especially those ethers of the higher alcohols derived from tallow or coconut oil and synthetic alcohols derived from petroleum; sodium coconut oil fatty monoglyceride sulphates and sulphonates; sodium and potassium salts of sulfuric acid esters of higher ($C_8$–$C_{18}$) fatty alcohol-alkylene oxide, particularly ethylene oxide, reaction products; the reaction products of fatty acids such as coconut fatty acids esterified with isethionic acid and neutralized with sodium hydroxide; sodium and potassium salts of fatty acid amides of methyl taurine; alkane monosulphonates such as those derived by reacting alpha-olefins ($C_8$–$C_{20}$) with sodium bisulphite and those derived from reacting paraffins with $SO_2$ and $Cl_2$ and then hydrolysing with a base to produce a random sulphonate; and olefin sulphonates, which term is used to describe the material made by reacting olefins, particularly $C_{10}$–$C_{20}$ alpha-olefins, with $SO_3$ and then neutralizing and hydrolysing the reaction product. The preferred anionic surfactant compounds are sodium ($C_{11}$–$C_{15}$) alkyl benzene sulphonates and sodium ($C_{16}$–$C_{18}$) alkyl sulphates.

Suitable nonionic surfactant compounds which may be used include in particular the reaction products of compounds having a hydrophobic group and a reactive hydrogen atom, for example aliphatic alcohols, acids, amides or alkyl phenols with alkylene oxides, especially ethylene oxide either alone or with propylene oxide. Specific anionic surfactant compounds are alkyl ($C_6$–$C_{22}$) phenols-ethylene oxide condensates, generally 5 to 25 EO, i.e., 5 to 25 units of ethylene oxide per molecule, the condensation products of aliphatic ($C_8$–$C_{18}$) primary or secondary linear or branched alcohols with ethylene oxide, generally 5 to 40 EO, and products made by condensation of ethylene with the reaction products of propylene oxide and ethylenediamine. Other so-called nonionic surfactant compounds include long chain tertiary amine oxides, long chain tertiary phosphine oxides and dialkyl sulphoxides.

Acid catalysts are known to increase the rate of polycondensation of L-aspartic acid. Typical acid catalysts are phosphoric acid, methane sulfonic acid, sulfuric acid, hydrochloric acid, formic acid, acetic acid and benzene sulfonic acid. Many other acid catalysts are listed in the above mentioned U.S. Pat. No. 5,457,176 to Adler et al. hereby incorporated by reference. When acid catalysts such as phosphoric acid are employed the molecular weight of the resulting polysuccinimide increases with the amount of catalyst employed in either dry or liquid media. Typically, the amount of acid catalyst in the thermal condensation reaction is in the range of from about 5% to about 30% by weight of L-aspartic acid. In the liquid system however, as the amount of catalyst is increased, the efficiency of the process decreases because of the need for increased power to stir the reaction mixture. The reaction mixture passes through a "sticky" phase during which time large lumps of solid material are formed and a great increase in the amount of torque is observed to continue stirring the reaction mixture. As will be shown below, the use of surfactant in small amounts prevents the formation of lumps and thus greatly reduces the required amount of torque in the liquid system and practically eliminates the "sticky" phase usually experienced during the thermal polycondensation reaction carried out in the presence of an acidic catalyst.

The amount of surfactant may vary widely and is limited only by physical limitations such as foaming in the liquid media or economic considerations of beneficial quantity. In most instances the amount of surfactant, based upon the amount of L-aspartic acid employed ranges from about 3% to about 10%, by weight, and preferably in the range of from about 4% to about 6%.

It is usual in the preparation of polysuccinimide to wash the product with water after removal from the reactor, particularly to remove acid catalyst, although in some utilities this is not necessary. It has been found that the presence of surfactant does not inhibit the removal of acid catalyst from the particles of polysuccinimide.

In most instances the polysuccinimide prepared in accordance with this invention is hydrolyzed in basic medium to provide polyaspartic acid which has many utilities as noted above. The hydrolysis is typically carried out in situ, without removing the polysuccinimide from the organic medium by adding an aqueous 5–20% solution of sodium hydroxide at a temperature of <100° C. for a period sufficient to hydrolyze the polymer thereby producing the sodium salt of the acid. The hydrolyzed product will remain in the aqueous phase and is easily separated from the immiscible organic medium by decantation or any suitable means for liquid-liquid separation.

The preferred liquid organic medium is selected from the group consisting of high boiling alkyl alcohols and alkanes. The high boiling alcohols are those having from 7 to 14 carbon atoms and can be straight or branched chain. High boiling alkanes are straight or branched chain alkanes having from 10 to 20 carbon atoms.

Typical examples of high boiling alkyl alcohols are heptanol, octanol, decanol, isodecanol, dodecanol and tridecanol and tetradecanol and mixtures thereof. Because of its boiling range and ease of separation, isodecanol is preferred.

Typical examples of high boiling alkanes are decane, dodecane, tridecane, tetradecane, pentadecane, hexadecane, octadecane and eicosane. A commercially available mixture of high boiling alkanes is sold under the trade name Therminol D12® by Monsanto Company, St. Louis Mo. Therminol D12 is a mixture of synthetic hydrocarbons having a liquid range of –48° C. to 260° C. The straight chain alkanes, particularly dodecane, are preferred.

The high boiling alkanes are preferred in the process of this invention because of their relative inactivity with respect to the acid catalyst, phosphoric acid. In practice, it has been found that the high boiling alcohols require purification to remove color from the medium more frequently than is the case with high boiling alkanes. Also, losses of the alcohol in the range of about twenty percent due to reactivity with the acid catalyst are expenses which are not encountered in the use of high boiling alkanes. High boiling alkanes are relatively non-reactive with respect to phosphoric acid and the other reactants in the process of this invention. Furthermore, it has been found that the high boiling alkanes can be reused repeatedly without noticeable degradation or need of a special purification step.

One of the most important aspects of the process of this invention is the use of a uniform mixture of the starting acid in the reaction medium, particularly if a catalyst is employed. It has been found desirable to provide agitation in the reaction medium, particularly during the early phase of the reaction. The starting acid has a tendency to become tacky during the polymerization reaction causing the particulate material to congeal into large particles which impede the progress of the reaction. This condition can be avoided by employing adequate agitation, particularly during the early phase of the reaction. In a preferred embodiment, the reaction medium is subjected to agitation during the reaction to maintain the solids in the reaction medium dispersed in the liquid medium as much as possible.

When a catalyst is employed, such as the well known phosphoric acid, it is important that the starting acid and catalyst be thoroughly and uniformly mixed. This can be achieved by combining the acid catalyst with the starting acid before being added to the reactor. If a liquid medium is employed, the acid catalyst is added to the organic medium directly and then thoroughly mixed so as to achieve uniform dispersal of the catalyst.

One result of inadequate mixing of the reaction medium is an increase in the color of the final product. As noted above, one of the desired results of any process for producing polysuccinimide is to provide a product having a color as close to white as possible. If the catalyst is not uniformly mixed with the starting acid or if a uniform suspension in the organic medium is not maintained, some of the material will be polymerized and will remain in the medium, at elevated temperature, longer than desired while the remainder of the starting acid is being polymerized. However, a uniform mixture of catalyst with the starting acid and a dispersed uniform slurry in the organic reaction medium, typically achieved by means of agitation, provides the optimum process conditions.

The most widely used catalyst is phosphoric acid, employed at a concentration in the range of from about 0.1 percent to about 40 percent, by weight of starting acid. Phosphoric acid can be employed in any of its many forms and derivatives including high concentrated (>100%) phosphoric acid such as methylenephosphonic acids as disclosed in U.S. Pat. No. 5,470,942 to Alexander et al. including aminotris(methylenephosphonic acid), ethylenediaminetetra (methylenephosphonic acid), hexamethylenediaminetetra (methylenephosphonic acid and diethylenetriaminepenta (methylenephosphonic acid). In one embodiment, 85% phosphoric acid is first blended thoroughly with the starting acid. While any means which achieves such mixing may be employed, the typical means is a centrifugal mixer such as that commercially available under the trade name Turbulizer. The dry particulate acid, such as aspartic acid, is fed to the mixer while being contacted with an aqueous solution of the acid catalyst. The starting acid, with catalyst, is then introduced into a reactor containing the organic reaction medium of this invention directly from the mixer. In a more preferred embodiment, the acid catalyst is an inorganic acid, typically phosphoric acid, combined with the organic medium after the addition of starting L-aspartic acid. Thorough mixing of the acid in the medium assures the uniform catalytic action on the starting acid thereby allowing uniform conversion of the starting acid to the polymeric product. This results in holding the polymer at reaction temperature the shortest possible time thereby preventing degradation and consequent increase in the color of the polymer.

The polycondensation reaction of L-aspartic acid to form polysuccinimide takes place in the range of from about 140° C. to about 200° C., and optimally in the range of from 160° C. to about 180° C. Such temperature range provides for adequately rapid polymerization so that the reaction time is reasonably short, i.e, the optimum balance between completion of the reaction and limited exposure of the reaction product to high temperature. As noted above a short reaction time at elevated temperature favors the production of light colored material while holding the polymer at reaction temperature for an extended period of time increases the amount of color in the product and darkens it. Reaction time in the range of from about 1 to 2 hours, preferably 1.5 hours, is usually sufficient to provide maximum conversion of the starting acid while not allowing excessive color to develop in the product. However, as also observed, the molecular weight of the polymer is increased with increase in reaction time in the temperature range noted above.

As noted above, it is advantageous to employ an acid catalyst in the process of this invention and the most typical of such acids is phosphoric acid. In the preferred embodiment of this invention, the catalyst is added in two portions. The first portion of acid catalyst is added before raising the reaction mass to the reaction temperature. Then, a second addition of acid catalyst to the reaction mixture after achieving reaction temperature provides an increase in the reaction rate thereby completing the reaction more quickly and without unduly long exposure of the polysuccinimide in the reactor to elevated temperature. For example, in the use of phosphoric acid as a catalyst, an additional amount of catalyst up to that equal to the initial amount charged to the reactor will quickly increase the reaction rate. Such increase in reaction rate decreases the time required for completion of the polycondensation reaction and shortens the time of exposure of the reaction product to the elevated temperature required for the reaction. Improved color and more uniform particle size of the resulting product are observed in processes wherein the phosphoric acid catalyst is added in at least two steps.

To further illustrate the process of the present invention there is described below non-limiting preferred embodiments. In the following examples percentage values are percent by weight unless otherwise specified. All reactions were conducted under a nitrogen atmosphere.

EXAMPLE 1

Into a 1 L ACE reactor equipped with an overhead stirrer, a thermocouple well, a nitrogen dispersion tube, and a straight takeover distillation head connected to a Dean-Start trap, was charged with 200 grams of L-aspartic acid, 35.3 grams of 85% phosphoric acid, and 500 grams of dodecane. The stirrer included a Lightnin R-500 high shear dispersing impeller at the bottom of the stirring rod and a Lightnin A-310 high efficiency axial flow impeller located about 2.5 inches above the R-500 dispersing impeller. The stirring speed was controlled by a GKH motor controller where a digital readout of the agitation speed and system torque can be easily observed. A controlled heating mantle which was used to heat the bottom part of the reactor while the reactor top part was heated with a nichrome wire. A set temperature of 190° C. and a one hour ramping time from room temperature to 190° C. were set in the controller. The condenser coolant temperature was around 0° to −10° C.

The mixture was heated and stirred at 1000 rpm. L-aspartic acid gradually agglomerated in dodecane in the presence of phosphoric acid as the temperature of the reactor contents increased. Many small lumps were observed suspended in the solution. When the reaction temperature reached about 135° C., some water was released as indicated by the formation of water condensate in the condenser. As the system started generating water, the reactor torque began to drop. At 164° C. the torque reading was at the lowest point of the entire reaction, then it increased rapidly. At this point the system appeared as bulk suspension (the beginning of the sticky phase). That is, the reactor mixture has formed several big lumps which slowly moved around the reactor wall. Within very short time, the lumps hardened and they significantly affected the stirring efficiency. Suddenly, the suspended lumps sunk to the reactor bottom and caused the bottom blade to seize causing the system torque to greatly increase instantly. At this point, the motor had to be stopped since the reactor blades could not move at all.

The reaction was continued without agitation. When the reaction temperature reacted to 190° C., more heat was applied so as to bring the reaction temperature to 216° C. over an additional period of one hour in an effort to drive the reaction to completion.

The hard solid was removed from the reactor and milled in a Waring blender filtered and dried in a vacuum oven. The dry product was further milled, and the fine powder was hydrolyzed with diluted caustic solution to formulate a 28% sodium polyaspartate solution. Analysis of molecular weight showed that the polyaspartate measured 12,011 Daltons by the Gel Chromatograph.

EXAMPLE 2

The procedure of Example 1 was repeated except that 10 grams of Neodol 25-7 (a nonionic surfactant marketed by Shell Oil Company) was added to the reaction mixture.

As the mixture was heated and stirred, a small degree of agglomeration occurred and it did not affect the agitation. At 134° C., although the agglomeration became more noticeable, the system stirring was not affected. Beginning from about 143° C., the system started generating water and the reactor torque consequently dropped. The mixture became very homogeneous, and it seemed that the surfactant had emulsified the system. The slurry appeared milky but homogeneous until the temperature reacted 170° C. and then, a phase discontinuation began to develop and the reactor torque increased slowly. No significant lump formation was seen. Then the solid in the reaction mixture turned to flakes which tended to go to the reactor bottom causing a small increase in torque. In about 5 seconds, the solids were freely suspended again. The system was maintained in smooth stirring through completion of the reaction.

When the system reached 190° C., 47 cc of water was collected. Final water collection was 61.6 grams (theoretical amount of water if full conversion would be 59.4 grams). The water appeared containing small amount of surfactant. The solid in the reactor was recovered in a manner similar to the procedure of Example 1. The sodium polyaspartate had an average molecular weight of 12,261 from the GPC analysis.

EXAMPLE 3

The procedure of Example 2 was repeated except that 10 grams of Witiconate 93-S (Isopropylamine dodecylbenzene sulfonate, an anionic surfactant marketed by Witco Company) was used in place of Neodol 25-7.

As the mixture was heated and stirred, a very even suspension was formed. Unlike Example 2, no agglomeration was observed before the milky state formed. Beginning from about 143° C., the system started generating water and the reactor torque consequently dropped. During the period that the system was heating from 143° C. to 180° C., the mixture had a milky appearance most of the time. There was period of time that the phase discontinuation occurred but it did not last long and did not affect the agitation. At 179° C., a minor increase in torque was noted, lasting about 10 seconds. After that the system remained easily stirred until the end of the reaction.

When the system reached 190° C., 52 cc water was collected. It was kept at 190° C. for 4.5 hours, nitrogen flow was adjusted to keep a small amount of reflux. At end of this reaction, 60.5 grams of water (theoretical amount of water if full conversion would be 59.4 grams) was collected. The water collection apparently contained a small amount of surfactant.

The product was isolated the same way as in Example 2 and hydrolyzed with a diluted caustic solution. The sodium polyaspartate had an average molecular weight of 11,368 from the GPC analysis.

The torque measurements, in g-cm units, obtained in Examples 1–3 are graphically presented and appear in the attached drawing. In the attached drawing Curve A is the data obtained from Example 1 wherein no surfactant was employed. Curve B is the data obtained from Example 2 wherein a nonionic surfactant was employed. Curve C was obtained from data obtained in Example 3 wherein an anionic surfactant was employed. In Example 1, the torque increased rapidly as the reaction temperature approached about 165° C. while the torque measured in Examples 2 and 3 remained considerably lower and relatively constant throughout the course of the reaction. These data show the remarkable reduction in torque required in the process of this invention wherein the polycondensation reaction is carried out in a liquid medium containing a surfactant in accordance with this invention.

EXAMPLE 6

Into a Thelco laboratory oven (Model 26) which was preheated to 200° C., were placed several series of glass jars, each containing about 28 g of L-aspartic acid and other ingredients as noted in the table below. Samples containing other ingredients such as phosphoric acid and surfactant were premixed in a microblender before being placed into the jars. For each series, at least seven samples in individual jars were prepared and weighed. The reaction time was calculated from the point at which the oven temperature reached 200° C. after placing all the sample jars in the oven. One sample from each series of jars was taken from the oven at each interval to measure the weight loss. In the calculation of L-aspartic acid conversion, the evaporation of some of the surfactant and the water from the 85% phosphoric acid was taken into account.

| Sample | 0 min. | 20 min. | 60 min. | 90 min. | 150 min. | 240 min. | 330 min. |
|---|---|---|---|---|---|---|---|
| L-aspartic acid | 2.63 | 3.67 | 21.68 | 25.87 | 33.46 | 38.44 | 42.65 |
| L-asp + 3% $H_3PO_4$ | 16.31 | 24.87 | 34.18 | 41.79 | 52.34 | 59.88 | 63.55 |
| L-asp + 3% $H_3PO_4$ + 2% Neodol 1–5 | 19.90 | 32.08 | 41.12 | 52.01 | 61.24 | 72.60 | 78.70 |
| L-asp + 7.5% $H_3PO_4$ | 23.50 | 43.31 | 60.13 | 70.33 | 74.64 | 60.58 | 84.58 |
| L-asp + 7.5% $H_3PO_4$ + 2% Neodol 1–5 | 24.05 | 50.15 | 69.94 | 78.66 | 81.51 | 92.79 | 96.27 |

From the above, it can be seen that the presence of surfactant in the reaction mixture with L-aspartic acid in combination with phosphoric acid increased the reaction rate of the polycondensation reaction thereby providing a greater amount of reacted material in equivalent time periods.

There has been described above a convenient, economical method for producing polysuccinimide having an acceptable color for use directly into such utilities as detergent and other uses where light color is required.

The high boiling organic medium has been shown to be reusable, in many instances without purification. When purification is required it is conveniently accomplished by simple distillation thereby providing an efficient means to provide light colored polysuccinimide not heretofore conveniently obtainable in large quantities in an industrial process.

Although the invention has been described in terms of specific embodiments which are set forth in considerable detail, it should be understood that this description is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A process for preparing polysuccinimide by the thermal polycondensation of L-aspartic acid which comprises carrying out the polymerization in the presence of an acidic catalyst and a surfactant selected from the group consisting of anionic and nonionic surfactants.

2. The process of claim 1 further wherein the acidic catalyst is an inorganic acid.

3. The process of claim 2 wherein the acid catalyst is phosphoric acid.

4. The process of claim 1 wherein the surfactant is present in the range of from about 3% to about 10% by weight of the L-aspartic acid.

5. The process of claim 3 wherein the process is carried out in a tray dryer.

6. The process of claim 3 wherein the tray dryer is directly heated by air.

7. The process of claim 3 wherein the tray dryer is indirectly heated.

8. The process of claim 1 wherein the surfactant is an alkoxylated alcohol.

9. The process of claim 1 wherein the surfactant is anionic and selected from the group consisting of sulfates and sulfonates.

10. The process of claim 1 wherein the surfactant is pre-mixed with the amino acid prior to being placed in said reaction medium.

11. A process for preparing polysuccinimide by the thermal polycondensation of L-aspartic acid which comprises providing a high boiling organic reaction medium containing an acidic catalyst for the polycondensation reaction of L-aspartic acid, heating the acid in said medium in the presence of said catalyst and a surfactant for a sufficient time to polymerize said amino acid.

12. The process of claim 11 wherein the surfactant is present in the range of from about 3% to about 10% by weight of said L-aspartic acid.

13. The process of claim 11 wherein the surfactant is the isoproplyamine salt of dodecylbenzene sulfonate.

14. The process of claim 11 wherein the surfactant is an anion surfactant selected from the group consisting of sulfates and sulfonates.

15. The process of claim 11 wherein the reaction medium comprises an alcohol selected from the group consisting of decanol, isodecanol and dodecanol.

16. The process of claim 11 wherein the reaction medium comprises and alkane selected from the group consisting of dodecane, tetradecane, hexadecane, octadecane and eicosane.

17. The process of claim 16 wherein the alkane is dodecane.

18. The process of claim 17 wherein the catalyst selected from the group consisting of phosphoric acid and methanesulfonic acid.

19. The process of claim 11 wherein the catalyst is present in the amount of from about 0.1 to about 40 percent by weight of said amino acid.

20. The process of claim 11 wherein the catalyst is added directly to said high boiling organic reaction medium prior to the addition of the starting acid.

21. The process of claim 11 wherein the catalyst is added in at least two portions to said reaction medium, a first portion added to the organic medium before the initiation of the polycondensation reaction and the second portion being added at least 30 minutes after the initiation of the polycondensation reaction.

22. The process of claim 11 further including the steps of separating the polysuccinimide from said reaction medium and reusing said medium in a process of claim 11 at least once.

23. The process of claim 11 wherein the reaction medium is reused directly in said process without further treatment.

24. A process for the production of polysuccinimide by the thermal polycondensation of L-aspartic acid in the presence of a surfactant and phosphoric acid catalyst in an organic medium comprising dodecane at a temperature in the range of from about 140° C. to about 200° C. for a period of from about 1 to about 2 hours.

25. The process of claim 24 wherein at least a portion of the phosphoric acid is added to the reaction medium after initiation of the reaction.

26. The process of claim 24 wherein the polysuccinimide is hydrolyzed by means of contacting the polymer with a basic aqueous solution in the presence of the organic medium whereby the mixture separates into an organic phase and an aqueous phase and the hydrolyzed polymer remains in the aqueous phase.

* * * * *

UNITED STATES PATENT AND TRADEMARK OFFICE
CERTIFICATE OF CORRECTION

PATENT NO. : 5,856,427
DATED : January 16, 1996
INVENTOR(S) : Yueting Chou

It is certified that error appears in the above-identified patent and that said Letters Patent are hereby corrected as shown below:

The Title of the above-identified patent and column 1, line 1 should read "IMPROVED PROCESS FOR THE PRODUCTION OF POLYSUCCIMINIDE". The issued patent does not have the term, "IMPROVED" in both locations.

Column 2, line 42, "($C_{10}$-$C_5$)" should read --($C_{10}$-$C_{15}$)--.

The table in Column 10, the fourth row under the heading of 240 min, "60.58" should read --80.58--.

Signed and Sealed this

Seventeenth Day of April, 2001

Attest:

NICHOLAS P. GODICI

Attesting Officer     Acting Director of the United States Patent and Trademark Office